R. O. HENSZEY.
MACHINE FOR TESTING SEALED CANS.
APPLICATION FILED MAR. 31, 1919. RENEWED JUNE 7, 1920.
1,372,690.
Patented Mar. 29, 1921.
6 SHEETS—SHEET 1.
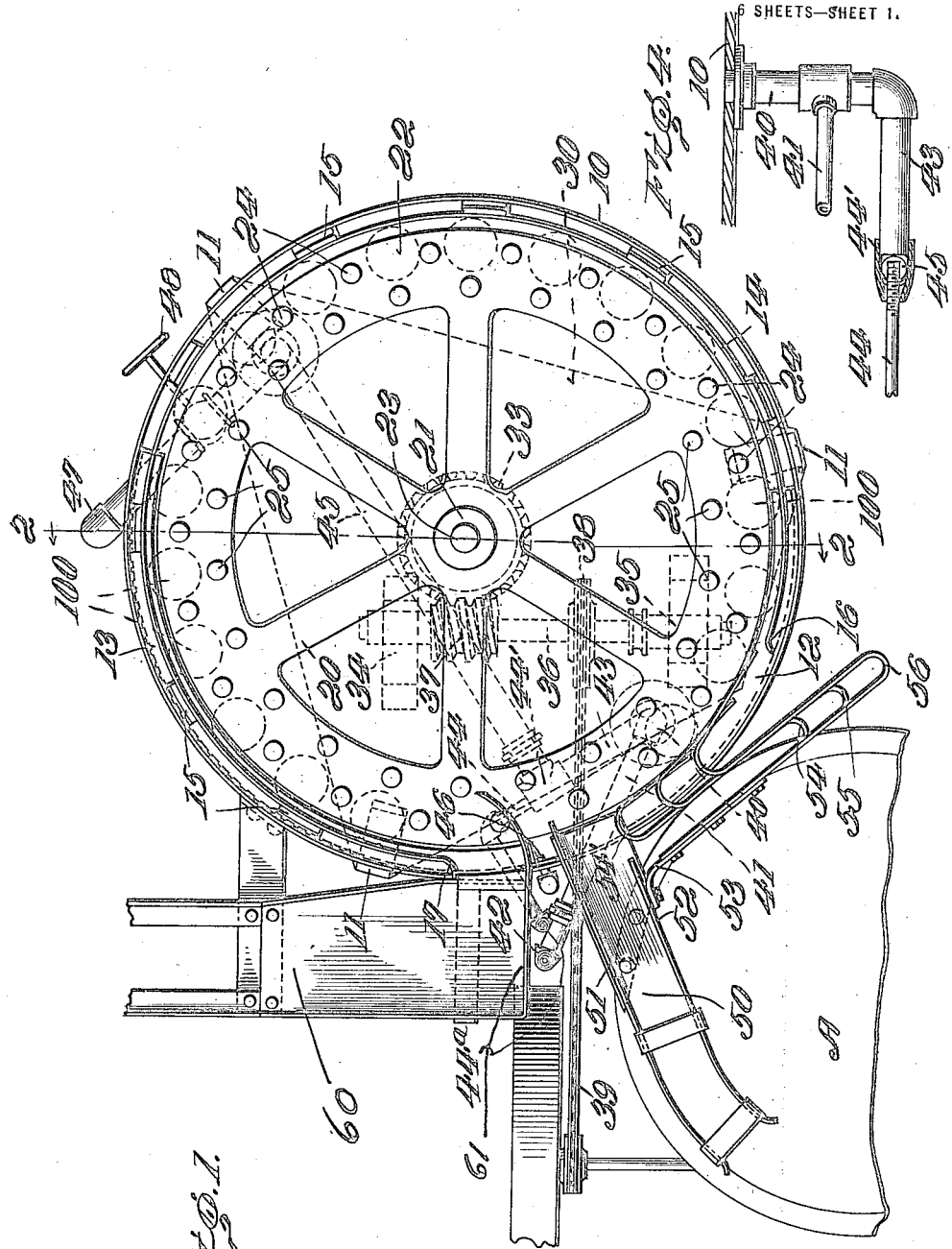
Inventor
Roy O. Henszey
By C. P. Goepel.
Attorney

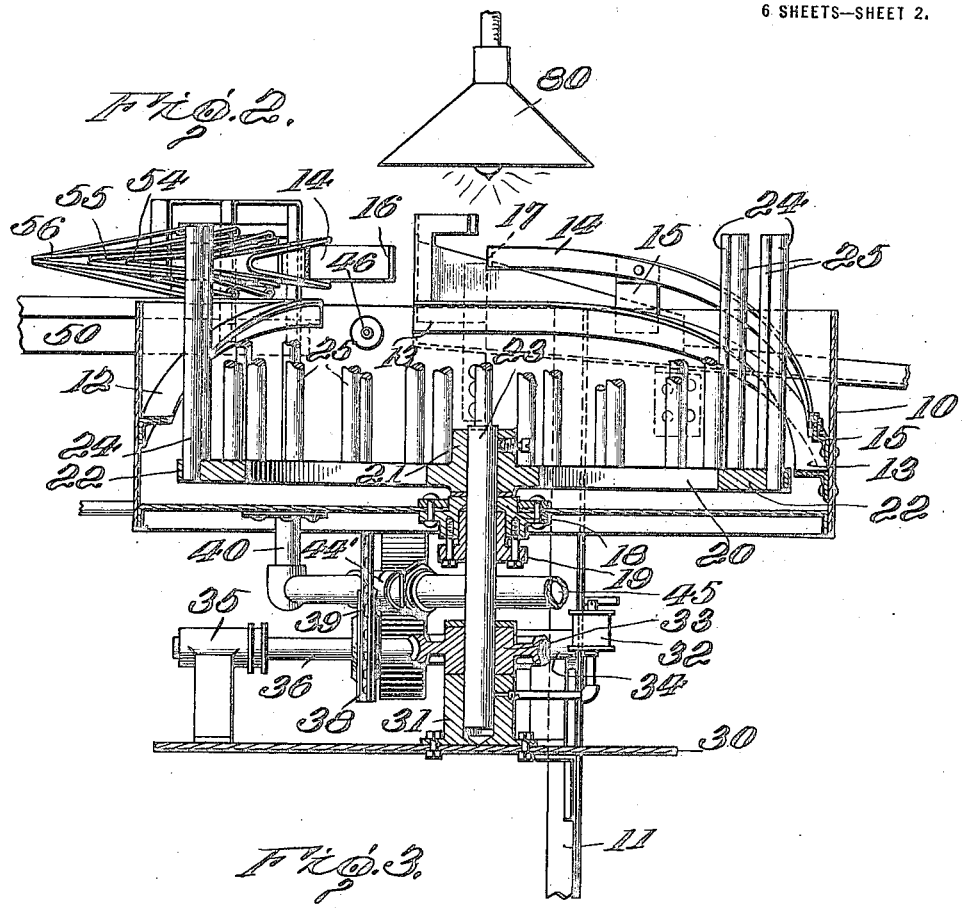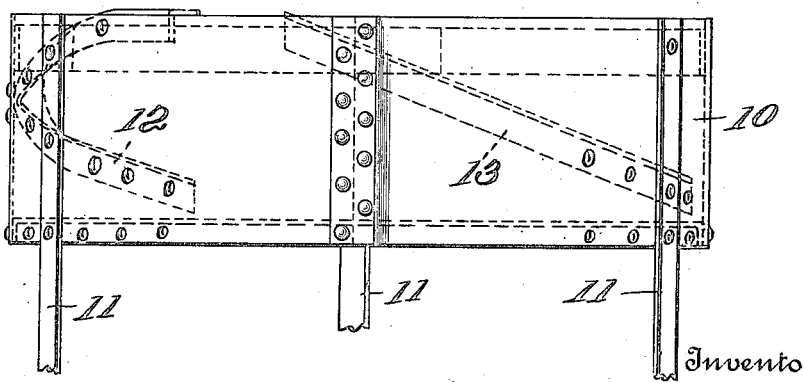

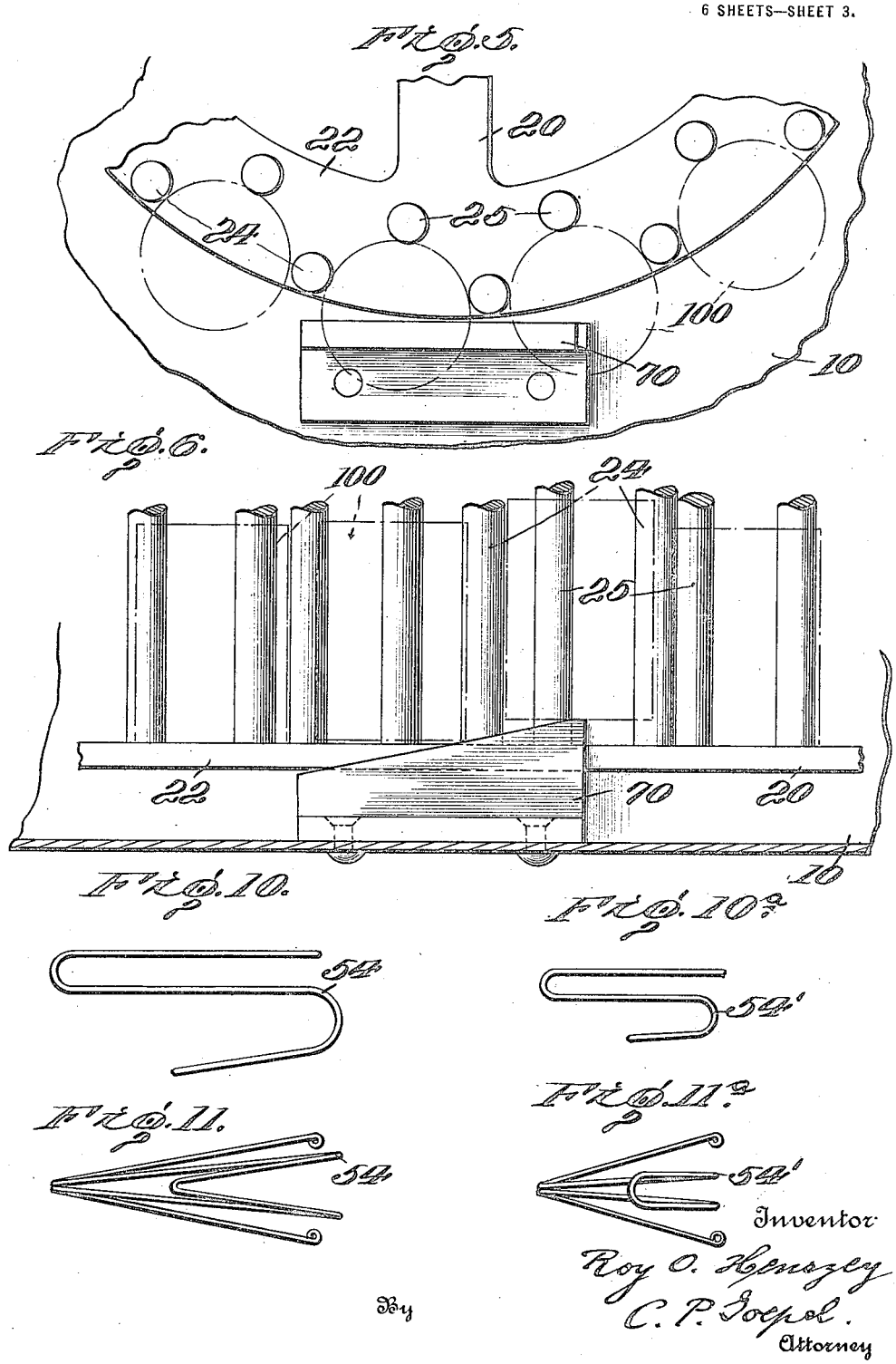

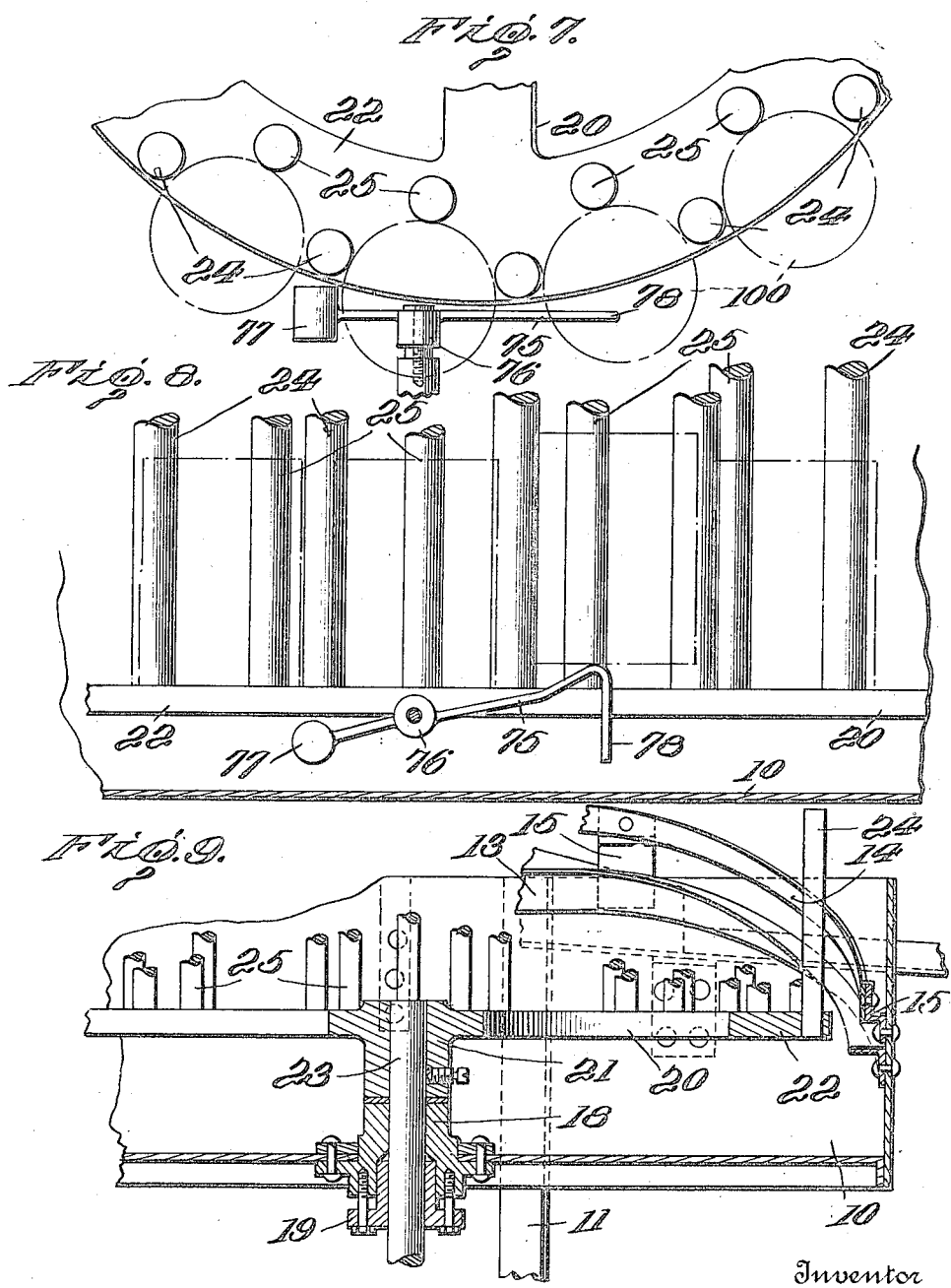

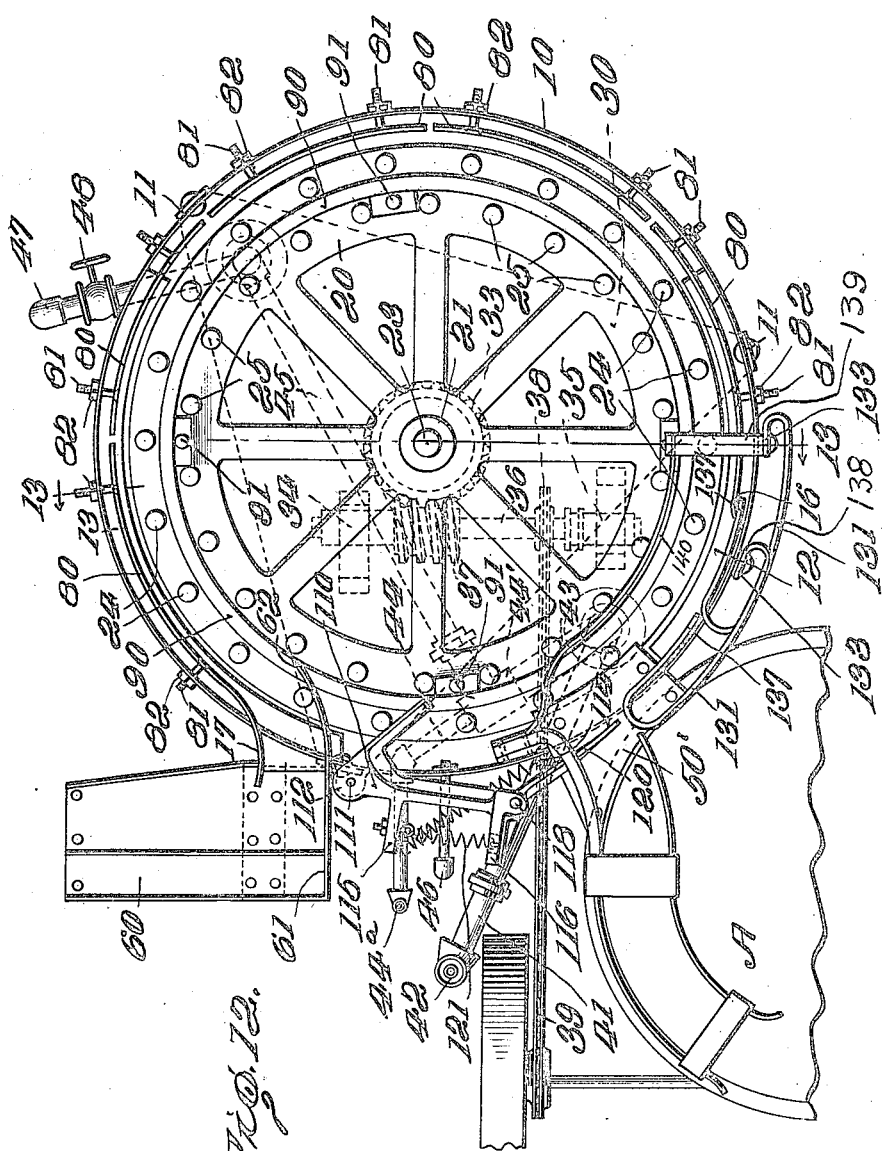

R. O. HENSZEY.
MACHINE FOR TESTING SEALED CANS.
APPLICATION FILED MAR. 31, 1919. RENEWED JUNE 7, 1920.
1,372,690.
Patented Mar. 29, 1921.
6 SHEETS—SHEET 6.
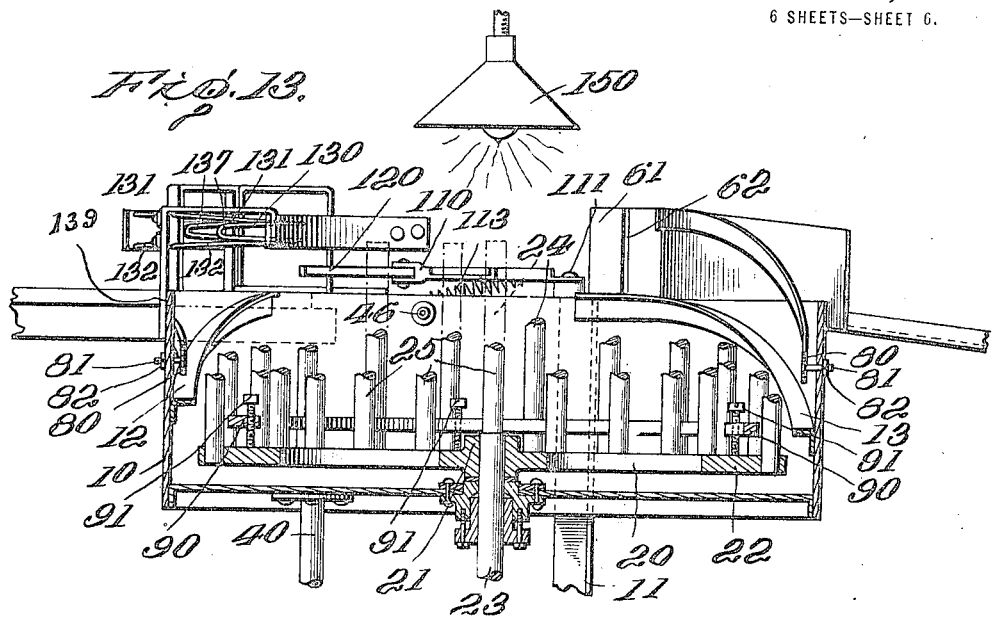
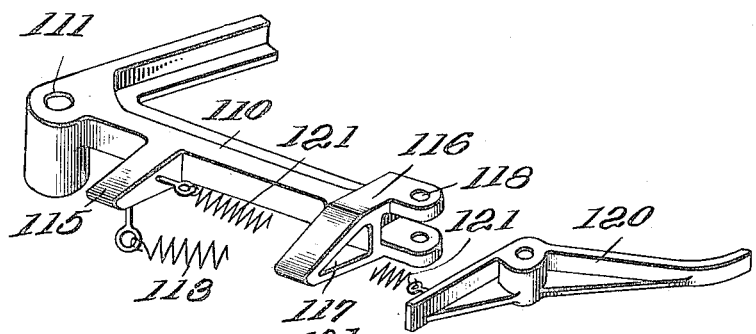
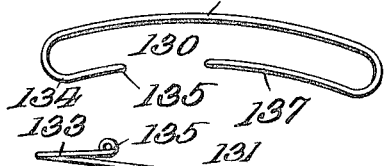
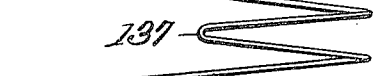
Inventor
Roy O. Henszey
C. P. Goepel
Attorney

UNITED STATES PATENT OFFICE.

ROY O. HENSZEY, OF CHICAGO, ILLINOIS.

MACHINE FOR TESTING SEALED CANS.

1,372,690.  Specification of Letters Patent.  Patented Mar. 29, 1921.

Application filed March 31, 1919, Serial No. 286,514. Renewed June 7, 1920. Serial No. 387,157.

*To all whom it may concern:*

Be it known that I, ROY O. HENSZEY, a citizen of the United States of America, residing at Chicago, in the county of Cook, in the State of Illinois, have invented certain new and useful Improvements in Machines for Testing Sealed Cans, whereof the following is a specification.

This invention relates to a machine for testing sealed cans containing evaporated milk, condensed milk or other articles of food or perishable substances with a view to discovering any cans which leak as well as those which are not properly filled and consequently are of light weight.

The object of the invention is to provide a machine for this purpose which will combine the properties of simplicity of construction and efficiency of operation.

Figure 1 of the accompanying drawings represents a plan view of a sealed can testing machine showing one embodiment of this invention.

Fig. 2 represents a transverse vertical section thereof on line 2—2 of Fig. 1, parts being broken away to facilitate illustration.

Fig. 3 represents a side elevation of the tank constituting a part of this machine.

Fig. 4 represents a side elevation of a portion of the means for maintaining a circulatory system of hot water in the tank.

Fig. 5 shows a detailed plan of one form of means embodied in the tank for causing the cans to suddenly rise and fall to facilitate the test for light weights.

Fig. 6 represents a detailed side elevation thereof.

Fig. 7 shows a detailed plan of another means for causing the cans to bob up and fall back in the tank to facilitate testing for light weights.

Fig. 8 represents a side view thereof.

Fig. 9 represents a partial section of a tank having an elevated can wheel adapted for testing "baby" cans or cans of smaller size.

Fig. 10 represents a plan view of one form of spring for holding the cans on entering the pockets.

Fig. 11 represents a side elevation thereof.

Figs. 10ª and 11ª are similar views of a modified form.

Fig. 12 represents a plan view of a machine having adjustability to cans of different diameters and different lengths, self-contained can feeding means, and different initial holding springs.

Fig. 13 represents a transverse vertical section thereof on line 13—13 of Fig. 12.

Fig. 14 represents a perspective view of a feeding device operated by the tester wheel for pushing the cans into the pockets thereof.

Fig. 15 represents a plan view of another form of spring for supporting the cans as they pass from the feed chute to the wheel pockets.

Fig. 16 represents a side view thereof.

Similar reference numbers indicate corresponding parts in the different figures of the drawings, round numbers indicating the principal elements and intermediate numbers the subordinate features thereof.

The embodiments of the invention herein illustrated show the machine adapted for testing sealed cans containing evaporated or condensed milk or other substance to be preserved. These particular embodiments will now be described in detail.

A tank 10 preferably circular in form and open at its top is supported on three or more legs 11. This tank is preferably constructed of boiler plate or other heavy sheet metal and is about thirty inches in diameter and is about ten inches deep. It is filled to a level about an inch from the top with a testing bath preferably composed of hot water maintained at a temperature of about 100° C. The tank is provided around its inner circumference with a stationary abruptly descending guide 12, a gradually ascending guide 13 and a peripheral guide 14. The descending guide 12 is preferably in the form of a curved angle plate attached to the wall of the tank and forming an inclined ledge thereon. This ledge declines from the point of intake of the cans at the top of the tank to a point about one fourth the distance around the tank near the bottom thereof. The ascending guide 13 is also in the form of an arch-shaped angle plate bolted to the wall of the tank. This guide forms an upwardly inclined ledge which extends around the tank for about one third the circumference thereof, beginning at a point near the bottom of the tank distant from the lower end of the descending guide somewhat less than half the circumference of the tank and ending at the top of the tank at the point of delivery of the cans, which is adjacent to the point of intake.

The peripheral guide 14 is in the form of a curved plate spaced from the wall of the tank and secured thereto at intervals by lugs 15. This guide has its beginning at the mouth of the intake and runs at a downward incline along the wall of the tank above the descending guide 12, thence horizontally along the wall of the tank in the space between the guides 12 and 13, thence at an upward incline along the wall of the tank above the ascending guide 13 to the point of delivery of the cans. The front end of the peripheral guide has a short out-turned lip 16. The rear portion extends above the tank and is secured to a bracket attached to the side thereof and has a longer out-turned lip 17. Any suitable form of curved guiding means may be employed, which is adapted to engage the cans above their bottoms and hold them against lateral displacement.

The tank is provided with a central opening in its bottom in which is set a duplex bearing 18 comprising a vertical shaft bearing and a horizontal end bearing. This duplex bearing is provided with a stuffing box which is closed by a gland 19.

A can carrier horizontal or approximately so and preferably in the form of a circular table or wheel 20 of a diameter somewhat less than the diameter of the tank is adapted to carry the cans through the bath and permit them to rise or rise and fall endwise during their passage through the bath. This wheel comprises a hub 21 and a broad rim 22. The hub 21 is secured to a vertical shaft 23 which turns in the vertical portion of said duplex bearing 18 and the lower end of said hub turns on the horizontal portion of said bearing. The rim 22 is provided on its upper face with a series of vertical, or substantially vertical, skeleton pockets each adapted to receive a can to be tested in vertical or substantially vertical position. These skeleton pockets carry the cans through the testing bath permitting the lowering and lifting thereof during the passage into and out of the liquid and the free rise and fall thereof endwise if of light weight, and exposing the cans to the view of the inspector throughout the operation. In the preferred construction the skeleton pockets are formed by an outer circular row of upright rods 24 set in the upper face of the rim 22 near the periphery thereof and an inner circular row of upright rods 25 set in said rim opposite the spaces between the rods of the outer row. Three of these rods, two of the outer row and one of the inner row constitute a pocket for a can. The rods 24 of the outer row are spaced apart a distance slightly in excess of the diameter of the cans to be tested and the rods of the inner row 25 are spaced from the inner peripheral guide 14 a distance slightly greater than the diameter of the cans. The rods extend above the top of the tank so as to grasp the cans as they are fed over the edge thereof.

The driving mechanism for the rotary can carrier is preferably located beneath the tank on a supporting frame 30. This frame 30 has a step bearing 31 in which the lower end of the shaft 23 turns, said step bearing being provided with a lubricator 32. A worm wheel 33 is secured on said vertical shaft. Two pillow blocks 34 and 35 are supported on said frame and a worm shaft 36 is journaled therein. This worm shaft is provided with a worm 37 which engages the worm wheel 33. This worm shaft also carries a sprocket wheel 38, which receives motion from a driving sprocket chain 39. This sprocket chain preferably connects with the pulley shaft of a Dickerson or other can filling machine whereby the testing machine is operated in synchronism therewith.

Means are provided for maintaining a continuous supply, overflow and circulation of heated water within the tank. Any suitable means for this purpose may be employed. The means shown comprise a feed pipe 40 which connects with the tank near one side thereof through the bottom thereof and a return pipe 45 which connects with the tank through the bottom thereof at a point preferably diametrically opposite the point of connection of the feed pipe. The pipe 40 preferably depends vertically from the tank for a short distance below the bottom thereof. A pipe 43 is connected at one end through a three-way coupling 44' with the front end of the return pipe 45 and at its other end through an elbow joint with the lower end of the pipe 40. A fresh water pipe 41 of smaller diameter than the pipe 40 and provided with a cock 42 connects a source of water supply with said pipe 40 above the point of connection therewith of the pipe 43. A steam pipe 44 of smaller diameter than the pipes 43 and 45 is connected with said pipe 43 through said three-way coupling adjacent the connection therewith of the return pipe 45 and is provided with a cock 44ᵃ. This steam pipe supplies steam to heat the water and induce circulation thereof. By an injective action it sucks the water from the return pipe and forces it through the pipes 43 and 40 into the tank in a heated state. A continuous circulation is thus maintained. An overflow pipe 46 disposed near the top of the tank permits a continuous outflow corresponding with the continuous inflow of fresh water through the pipe 41 so that the bath is kept clear. A waste pipe 47 having a cock 48 is connected with the pipe 43 beneath the tank for withdrawing the contents when desired.

A feed chute 50 connects the tank with the element A, which constitutes a part of or connection with the filling machine or other source of supply. One side wall 51 of this chute projects over the top edge of the tank and the other side wall 52 terminates at a point outside the periphery of the tank. A bracket 53 is attached to the side wall 52 near its inner end and a series of double U-shaped wire springs 54, 55 and 56 are attached to said bracket. The free loops of these springs project over the top edge of the tank, being arranged in succession one after another from a point at the mouth of the feed chute to a point of beginning of the peripheral guide 14, when the latter is employed. The secondary U-bend of the first spring 54 projects into the gap in the side wall of the feed chute 50 and serves as a yielding biting device to hold the cans as they leave the chute and enter between the rods of the wheel 20. After the cans enter between the rods of the wheel they are held between said rods and the free sides of the successive U-shaped springs until they descend in their pockets into the tank. They are then held between said rods and the peripheral guide within the tank, which may be the inner periphery of the tank itself or the supplemental peripheral guide 14 within the tank. A modified form of spring is shown at 54' (Figs. 10ª and 11ª).

A delivery chute 60 is disposed at the top of the tank adjacent to the feed chute 50. The end wall 61 of this delivery chute has an inward curved extension 62 which projects over the top of the tank above the tops of the pins of the can pockets on the can wheel. This extension engages the tops of the cans as they come up the ascending guide 14 and tilts them into the chute 60, down which they roll to any desired point.

The conduct of a can in its passage through the bath may indicate that it is a "light weight," namely that it is only partially filled. But specific means for picking out light weights are preferably provided. One means may consist of a fixed projection 70 attached to the bottom of the tank and projecting above the rim of the wheel 20 between it and the wall of the tank. This projection is preferably in the form of an inclined ledge and as the cans are carried over it they are made to bob upward. The operator has simply to notice the manner in which the can goes down again into its position of rest on the bottom of the pocket. If it be a light weight it will naturally go slower than those which are correctly filled.

Another means of testing for light weights consists of an unbalanced lever 75 supported on a fulcrum 76 adjacent to the periphery of the wheel 20. This lever has a weight 77 on one side of its fulcrum whereby its free end 78 is normally held above the plane of said wheel. The weight 77 is not sufficient to counterbalance the weight of a properly filled can, consequently such cans as they pass the lever will depress it and will not be lifted by it. On the contrary a partially filled and light weight can will be lifted by the lever, which exerts an upward pressure against the bottom of the can not quite equal to the downward pressure of the weight of the can. If the cans are correctly filled the lever has no influence on them; if they are a little under weight the pressure of the lever exceeds the downward pressure of the can and causes the can to jump. The normal or tall can weighs two ounces when submerged, and the weight 77 is preferably so adjusted as to provide a one-and-three-fourths-ounce pressure on the lever, so that theoretically the test lever should reveal those cans which are one fourth ounce too light. The pressure of the lever is adjusted as required for cans of other sizes.

In the use of this machine, an attendant sits outside the tank at a point preferably near the ascending guide 13, opposite the path through which the cans travel when totally submerged in the bath. The can carrying wheel 20 is rotated in unison with the filling machine with which this apparatus is connected, preferably at a speed about ten per cent. above the speed of the filling machine so that patched cans may be passed through the testor in addition to those which come from the filling machine. The cans 100 are fed through the feed chute 50 from the filling machine over the top of the tank 20 and as the can wheel rotates severally enter in upright position the pockets formed by the rods 24 and 25. In passing out of the mouth of the chute 50 the cans are engaged by the springs 54, 55 and 56 which hold them in contact with the upwardly extended portions of said rods. After entering the pockets the cans descend therein by their own gravity, being guided and prevented from a bumping fall which would disturb the bath, by the fixed inclined guide 12, the bottoms of the cans projecting beyond the periphery of the wheel and engaging said guide. Between the guides 12 and 13 the cans rest on the wheel rim and are totally submerged. During this period the cans are subjected to the heat of the bath and their contents expand and any can that contains a leak will be disclosed to the attendant by air bubbles or milk oozing out therethrough. The attendant lifts out any such defective cans, which are easily accessible through the skeleton pockets. After passing this testing traverse the cans are lifted within the wheel pockets by the ascending guide 13 to the upwardly extended portions of said pockets, and then tilted by the extension 62 into the delivery chute 60. The extension 62 may be omitted and the cans discharged in vertical position if desired.

The embodiment shown in Figs. 12 and 13 is provided with self-contained feeding means, with adjustable means adapting the machine for cans of different diameters and cans of different lengths or heights, and with initial holding springs differing from those previously shown. In this form means are provided for changing the lateral depth of the can pockets. This is done by changing the space between the inner rods 25 of the rotary can carrier or test wheel 20 and the peripheral guide within the tank 10. In lieu of the peripheral guide 14 shown in Figs. 1, 2 and 3, a peripheral guide 80 is employed which is laterally adjustable between the tank wall and the test wheel. This guide is preferably constructed in a plurality of arc-shaped sections. Each of these sections is provided with stud bolts 81, which project through the wall of the tank and are provided with nuts 82 outside the tank whereby the sections are adjusted to a greater or less distance from the wall thereof, such adjustment reducing or enlarging the lateral depth of the can pockets of the can wheel according to the direction of adjustment. The first section has the outward lip 16 of the other construction and the last section has the longer out-turned lip 17.

Means for adapting the machine to cans of different heights consist of a ring 90 which is disposed on the upper face of the rim of the test wheel 20 between the rows of studs 24 and 25 thereof. This ring may be of a thickness adapted to effect one change in the vertical depth of the skeleton pockets of said wheel, but it is preferably provided with adjusting studs 91 screwthreaded in lateral ears 92 on the ring, whereby it may be lifted more or less above said rim and adapt the pockets to cans of various heights.

A can feeder is preferably provided as a part of the can tester and operative therefrom for use when the source of supply does not feed the cans in a regular or positive manner. The feeder herein shown comprises means actuated by the pocket rods of the can carrier wheel 20 and consists of an acute angled lever 110 and an obtuse angled push finger 120 carried by said lever. The lever 110 is pivoted at its angle on a fulcrum 111 on a lug 112 bolted to the wall of the tank 10 between the feed spout and the delivery spout, which in this construction are disposed somewhat apart from each other. The short arm of the lever 110 projects over the top of the wall of the tank 10 into the path of the outer series of pocket rods 24 of the test wheel 20. A spring 113 is connected at one end to a fixed eye 114 attached to the tank wall near the feed spout and at its free end to a lug 115 on the long arm of said lever near the fulcrum thereof. This spring tends to pull the long arm inward toward the tank and thereby swing the short arm into the path of said outer rods of the test wheel. The said long arm is also provided near its free end with an outward lug 116 having a slot 117. The obtuse angled finger 120 is pivoted to the outer end of the lever 110 on a pintle 118 and the short arm thereof is normally held in contact with said slotted lug 116 by a spring 121 which is connected at one end with the lug 115 of said lever and at its other end to the short arm of the finger 120, said spring passing through the slot 117 of the lever lug 116. The push finger 120 preferably curves inward in its outer portion. In the operation of the machine each pocket rod 24 comes in contact with the short arm of the lever 110 and swings the long arm thereof outward against the tension of the spring 113. This action carries the finger 120 outward and the free end thereof wipes past the can which is nearest the mouth of the feed spout, swinging on the pintle 118 against the tension of the spring 121. As soon as the finger passes said can, it is thrust behind said can under the action of said spring. Then the particular rod 24 which is in contact with the short arm of the lever 110 moves past and releases said lever and the spring 113 pulls it inward. The finger 120 is thereby carried inward and pushes the can in front of it into a pocket of the test wheel.

Figs. 15 and 16 show the preferred form of spring for holding the cans as they pass from the feed chute to the can pockets, this form being also shown in Fig. 13, taking the place of the springs for this purpose shown in Fig. 1 and bearing numbers in the fifties. This spring 130 is composed of wire in one piece and consists of two bow-shaped members 131 and 132 disposed one above the other in the same vertical plane. These members are provided at the same ends with attaching shanks 133 and 134 in the form of short return bends provided with eyes 135 and 136. The opposite ends of said bow-shaped members have a U-shaped connecting member 137 which engages the cans. Two of these springs are usually employed, one being attached to an upright bracket 138 and the other to a bracket 139.

In the Figs. 12 and 13 there is connected with the feed spout an inner guide 140 disposed above the pockets and opposite the springs 130. This guide forms with the springs an initial pocket for holding the cans before they drop into the wheel pockets.

An electric light 150 having a shade is disposed over the tank and throws the light rays downward in the skeleton can pockets and enables the attendant to discover cans which are defective from leakage or light weight.

The preferred embodiment of the invention is herein described, but alterations may be made without departing from the spirit and scope of the invention as expressed in the claims.

I claim as my invention:

1. A filled can testing machine comprising a testing bath tank, and a rotary can carrier disposed in said tank and provided with a circular series of can pockets in which the cans are free to rise and fall in said pockets during the passage through the bath.

2. A filled can testing machine comprising a testing bath tank provided with can guides, and a rotary can carrier provided with a circular series of can pockets adjacent to its periphery, said pockets permitting the cans to project over said periphery and engage said guides in lowering and lifting the cans within said pockets.

3. A filled can testing machine comprising a testing bath tank provided on its inner periphery with a descending can guide, and an ascending can guide, and a rotary can carrier provided with a circular series of can pockets on its upper face adjacent its periphery, said pockets permitting the cans to project over said periphery and engage said guides in lowering and lifting the cans.

4. A filled can testing machine comprising a testing bath tank provided on its inner periphery with a descending can guide adjacent to the point of intake of the cans and an ascending can guide adjacent to the point of delivery of the cans, and a rotary can carrier provided with a circular series of can pockets on its upper face adjacent its periphery, said pockets permitting the cans to project over said periphery and engage said guides in lowering and lifting the cans.

5. A filled can testing machine comprising a testing bath tank provided on its inner periphery with a descending can guide adjacent to the point of intake of the cans, an ascending can guide adjacent to the point of delivery of the cans and a peripheral can guide, and a rotary can carrier provided with a circular series of can pockets on its upper face adjacent its periphery, said pockets permitting the cans to project over said periphery and engage said guides in lowering and lifting the cans.

6. A filled can testing machine comprising a testing bath tank, a rotary can carrier operative in said tank and provided with substantially vertical pockets extending above the tank, and means for feeding the cans in substantially vertical position into the upwardly extended portions of said pockets.

7. A filled can testing machine comprising a testing bath tank, a rotary can carrier disposed in said tank and provided with substantially vertical pockets extending above the tank, means for feeding the cans in substantially vertical position into the upwardly extended portions of said pockets, and means for withdrawing the cans from the upwardly projecting portions of said pockets.

8. A filled can testing machine comprising a testing bath tank, and a rotary can carrier rotatable in said tank and provided on its upper face adjacent its periphery with a circular series of skeleton substantially vertical can pockets.

9. A filled can testing machine comprising a testing bath tank, and a rotary can carrier provided with an outer circular series of upright rods set in its upper face adjacent its periphery and an inner circular series of upright rods disposed opposite the spaces between said outer series, said rods forming skeleton pockets for holding the cans during their passage through the bath.

10. A filled can testing machine comprising a testing bath tank, a circular can carrier rotatable therein provided with a circular series of substantially vertical can pockets in which the cans are free to rise and fall during the passage through the bath, and means in said tank for imparting an upward jolt to the cans in testing light weights.

11. A filled can testing machine comprising a testing bath tank, a circular can carrier rotatable therein, and means in said tank for jolting the cans in testing light weights consisting of an unbalanced lever which normally projects into the path of the cans, said lever being provided with a weight adjusted to underbalance a normally filled can.

12. A filled can testing machine comprising a testing bath tank, and a rotary can carrier disposed in said tank and provided with a circular series of substantially vertical can pockets adapted to hold the cans in substantially upright position and in which the cans are free to rise and fall endwise during the passage through the bath, their upper ends being exposed to view.

13. A filled can testing machine comprising a testing path tank, and a rotary can carrier provided with a circular series of can pockets adapted to carry the cans end-up and to cause them to submerge and emerge with their upper ends exposed to view in their passage through a hot bath contained in said tank.

14. A filled can testing machine comprising a testing bath tank, a rotary can carrier having a circular series of can pockets which peripherally expose the cans, and means on said tank for guiding said cans.

15. A filled can testing machine comprising a testing bath tank, a rotary can carrier having a circular series of can pockets which peripherally expose the cans, means on said tank for guiding said cans, and means for adjusting said guiding means to adapt it to cans of different diameters.

16. A filled can testing machine comprising a testing bath tank, a rotary can carrier having a circular series of can pockets which peripherally expose the cans, and a peripheral guide constructed in sections and secured to the inner face of said tank for engaging said cans.

17. A filled can testing machine comprising a testing bath tank, a rotary can carrier having a circular series of can pockets which peripherally expose the cans, a peripheral guide constructed in sections and secured to the inner face of said tank for engaging said cans, and means for adjusting the sections of said guide.

18. A filled can testing machine comprising a testing bath tank, a rotary can carrier having a circular series of can pockets which peripherally expose the cans, and an arc-shaped guide in the tank engaging the bottoms of the cans.

19. A filled can testing machine comprising a testing bath tank, a rotary can carrier having a circular series of can pockets which peripherally expose the cans, an arc-shaped guide in the tank engaging the bottoms of the cans, and means for raising and lowering said arc-shaped guide to adapt it to cans of different heights.

20. A filled can testing machine comprising a testing bath tank, a rotary can carrier having a circular series of substantially vertical can pockets, and self-contained feeding means actuated by said can carrier and operative to feed cans thereinto in substantially vertical position.

21. A filled can testing machine comprising a testing bath tank, a rotary can carrier adapted to carry the cans through the bath and provided with a circular series of can pockets, and curved guiding means adapted to engage the cans above their bottoms and hold them against radial displacement.

22. A filled can testing machine comprising a testing bath tank, a rotary can carrier adapted to carry the cans through the bath and provided with a circular series of can pockets, and curved guiding means adapted to engage the cans above their bottoms and hold them against radial displacement, the inner periphery of the tank constituting said means.

23. A filled can testing machine comprising a testing bath tank, and a can carrier having a series of substantially upright pockets adapted to loosely hold the cans and to carry the cans through the bath.

24. A filled can testing machine comprising a testing bath tank, and a can carrier having a series of substantially vertical pockets adapted to carry the cans through the bath and permit them to rise and fall endwise during the passage through the bath, their upper ends being exposed to view.

25. A filled can testing machine comprising a testing bath tank, a can carrier having a series of substantially vertical pockets adapted to carry the cans through the bath and permit them to rise and fall endwise during the passage through the bath, and curved guiding means adapted to engage the cans above their bottoms and hold them against radial displacement.

26. A filled can testing machine comprising a testing bath tank, a can carrier having a series of substantially vertical pockets adapted to carry the cans through the bath and permit them to rise and fall endwise during the passage through the bath with their upper ends exposed to view, and curved guiding means adapted to engage the cans above their bottoms and hold them against radial displacement.

27. A filled can testing machine comprising a testing bath tank adapted to contain a hot water bath, a can carrier extending above and below any determinate water level for said tank and having a series of vertical can pockets adapted to loosely hold the cans in upright position, to receive and deliver them above said determinate water line and to push them through said bath, and stationary guiding means engaged by said cans.

28. A filled can testing machine comprising a testing bath tank adapted to contain a hot water bath, a can carrier extending above and below any determinate water level for said tank and having a series of can pockets adapted to loosely hold the cans, to receive and deliver them above said determinate water line and to push them through said bath, and stationary guiding means engaged by said cans.

29. A filled can testing machine comprising a testing bath tank adapted to contain a hot water bath, and a can carrier extending above and below any determinate water level for said tank and having a series of individual can pockets adapted to separately engage the respective cans, to receive and deliver them above said determinate water line and to push them through said bath, said individual can pockets being adapted to hold the cans against horizontal movement relative to the carrier and to permit vertical movement thereof.

In testimony that I claim the foregoing as my invention, I have signed my name hereunder.

ROY O. HENSZEY.